A. L. KITSELMAN.
WIRE WEAVING MACHINE.
APPLICATION FILED JULY 1, 1908.
1,014,599.
Patented Jan. 9, 1912.
11 SHEETS—SHEET 1.
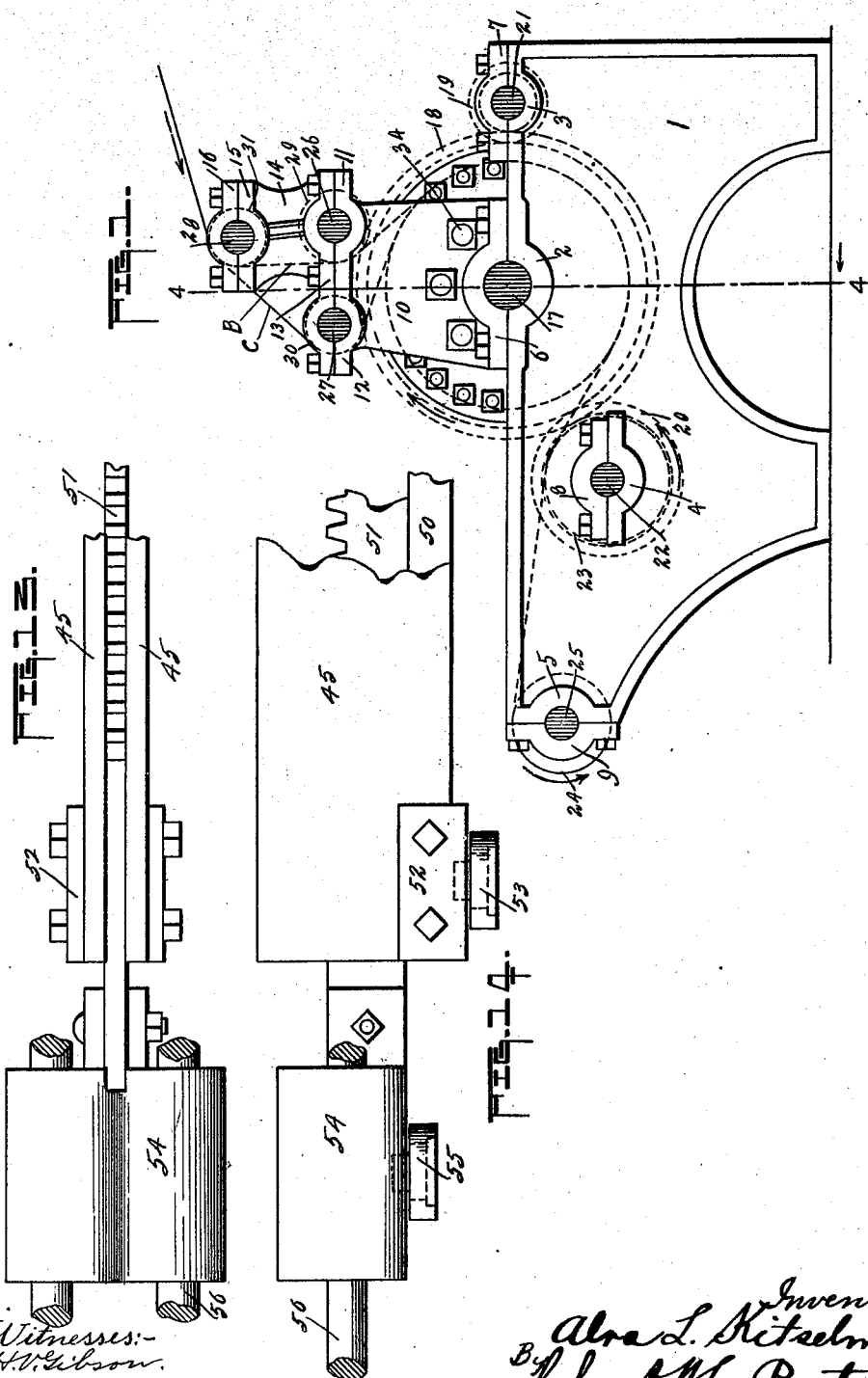

A. L. KITSELMAN.
WIRE WEAVING MACHINE.
APPLICATION FILED JULY 1, 1908.
1,014,599.
Patented Jan. 9, 1912.
11 SHEETS—SHEET 2.
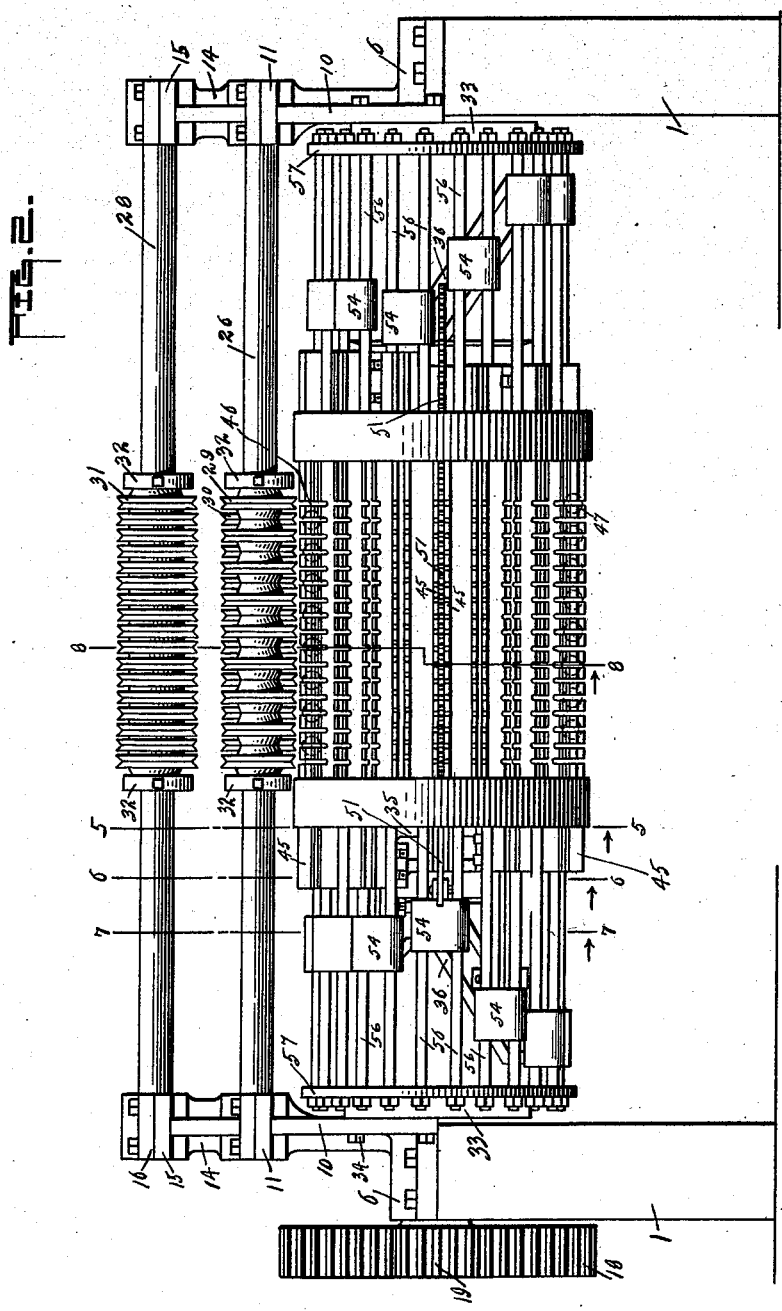
Witnesses:
H. V. Gibson.
Laura E. Claypool.
Inventor.
Alva L. Kitselman
By Chas. N. LaPorte
Atty.

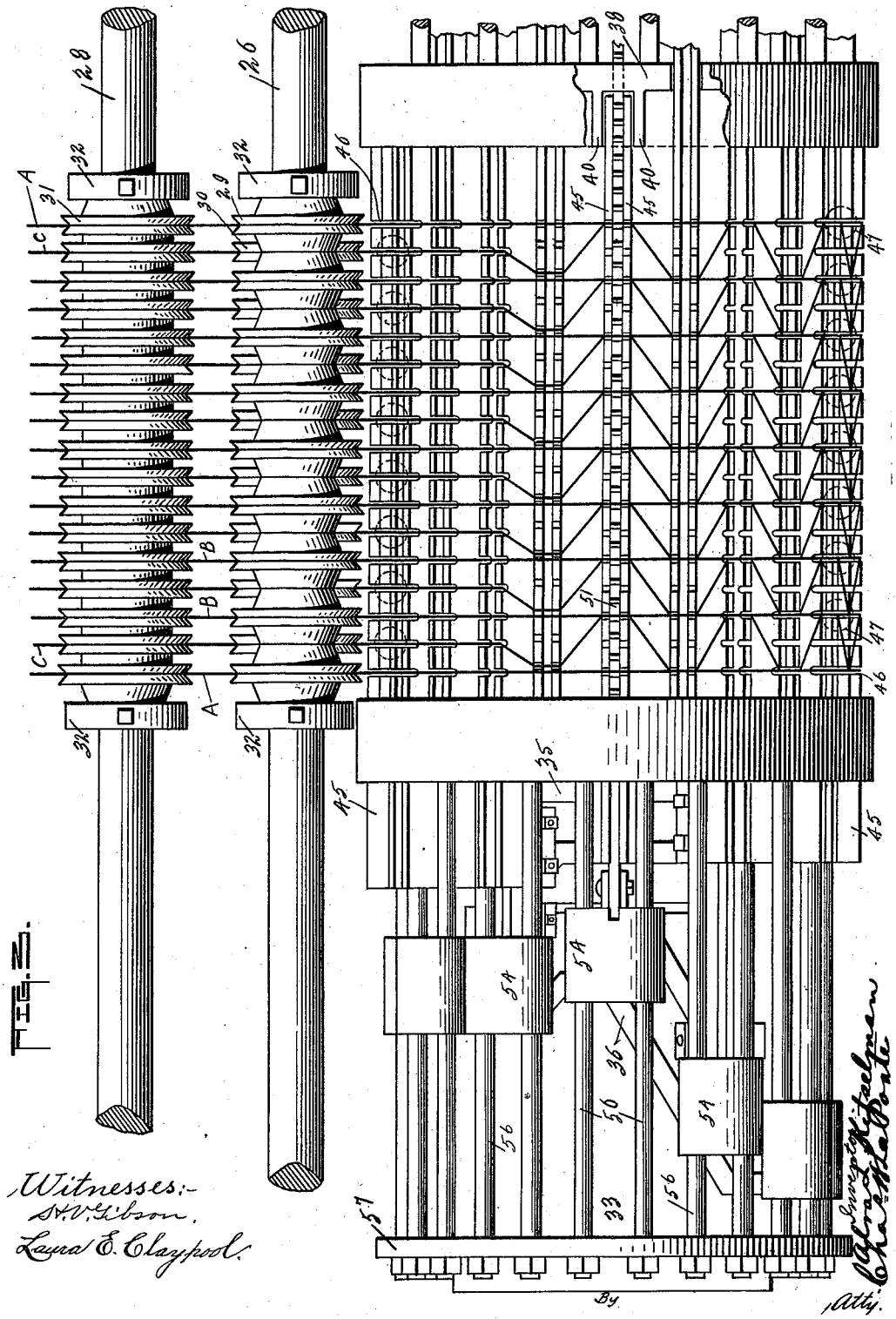

A. L. KITSELMAN.
WIRE WEAVING MACHINE.
APPLICATION FILED JULY 1, 1908.
1,014,599.
Patented Jan. 9, 1912.
11 SHEETS—SHEET 4.
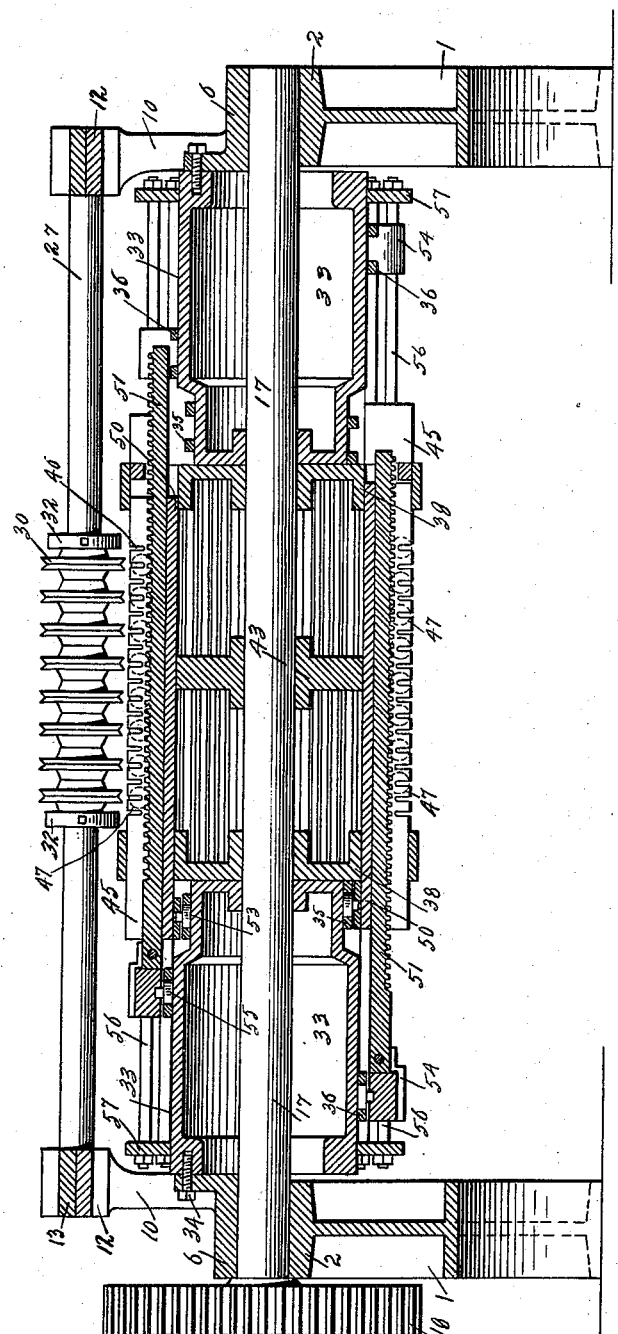

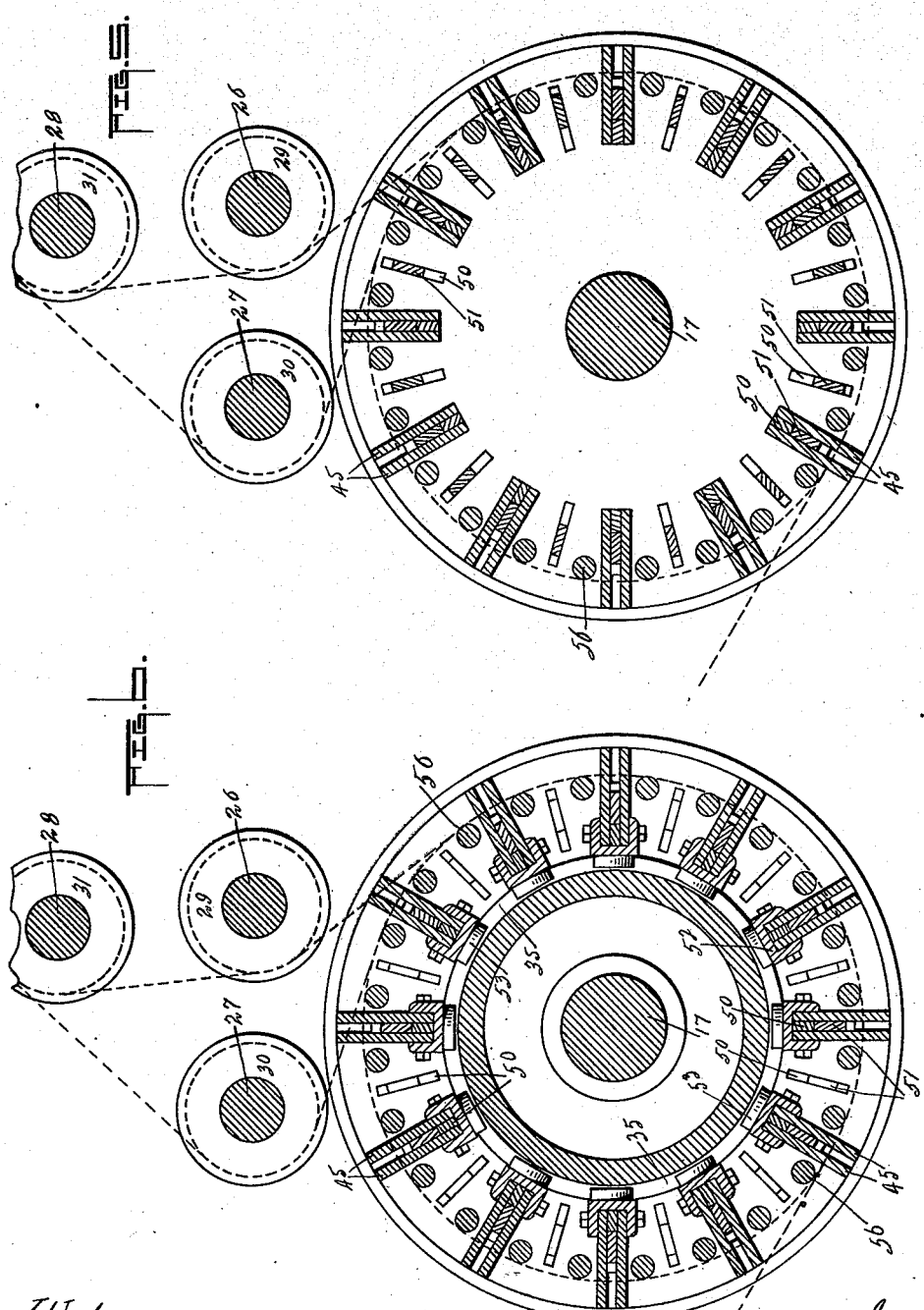

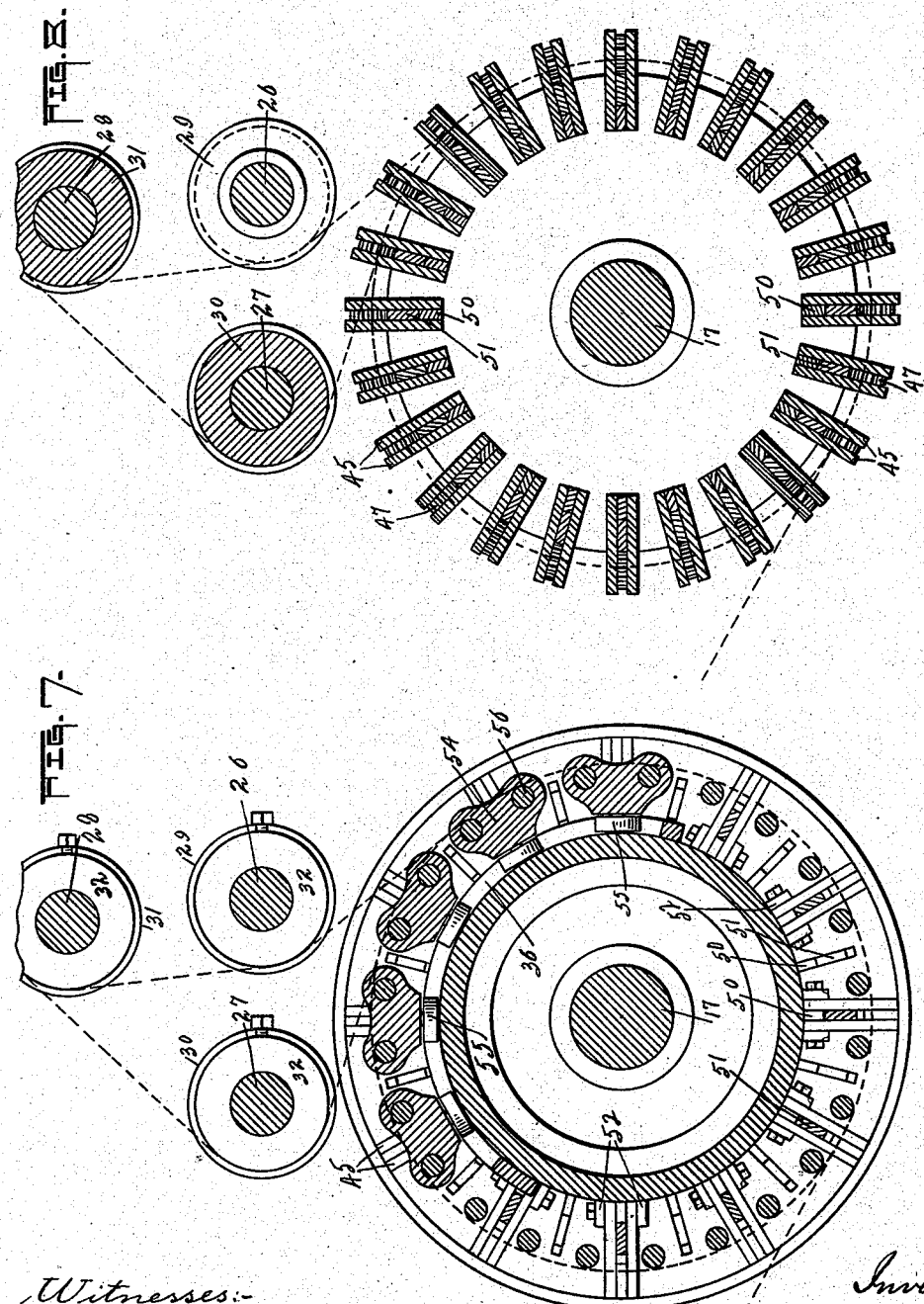

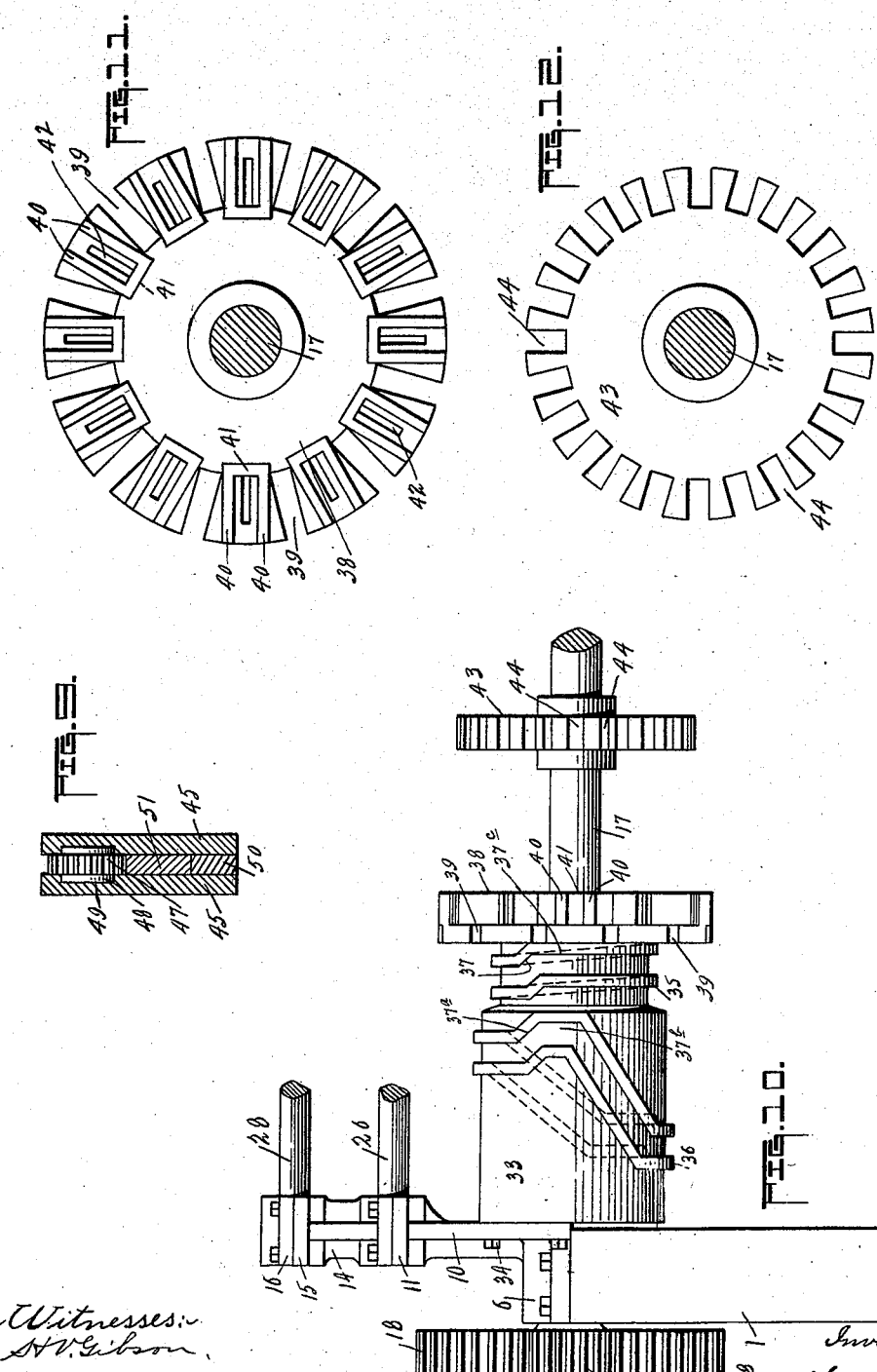

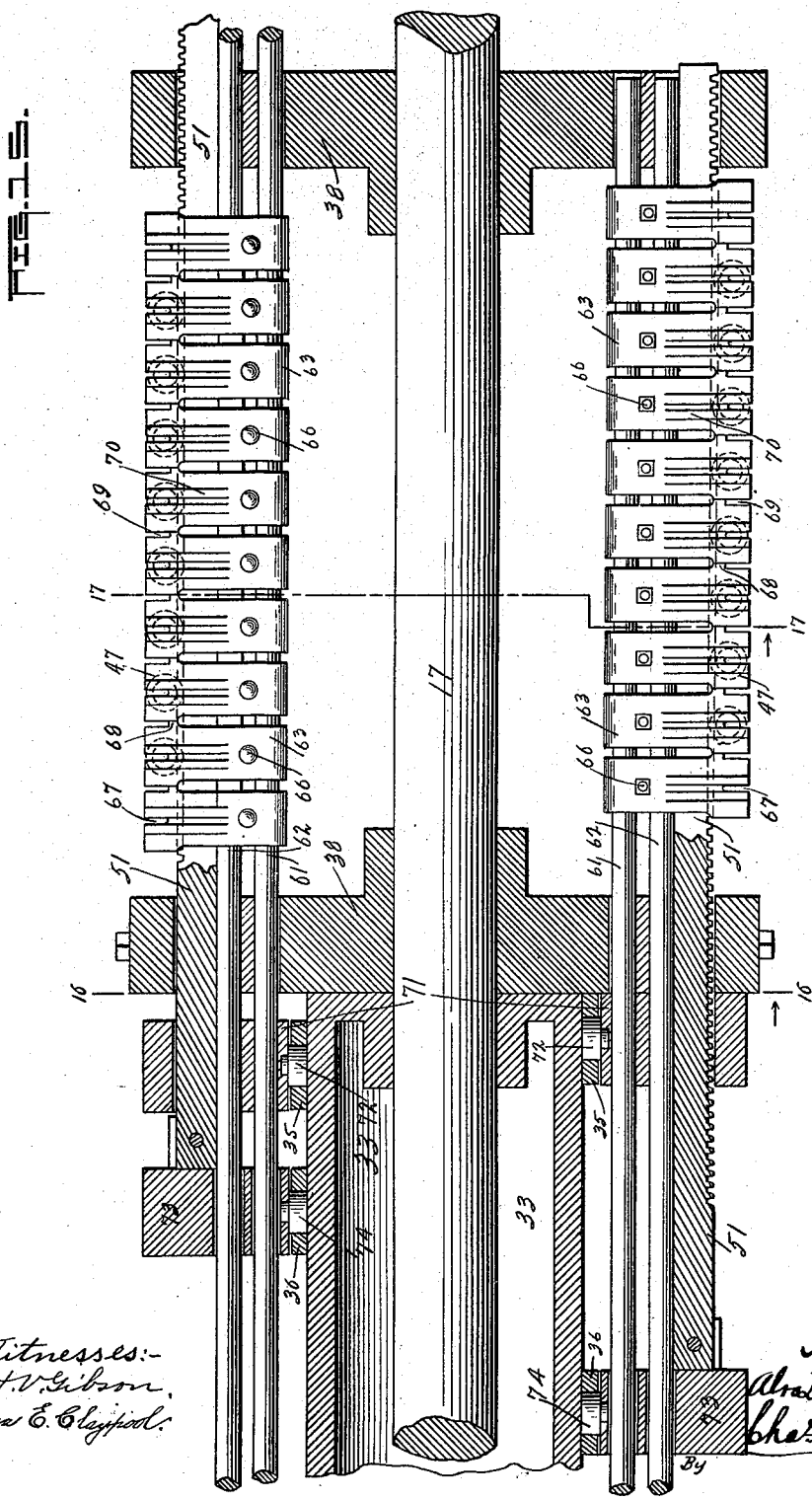

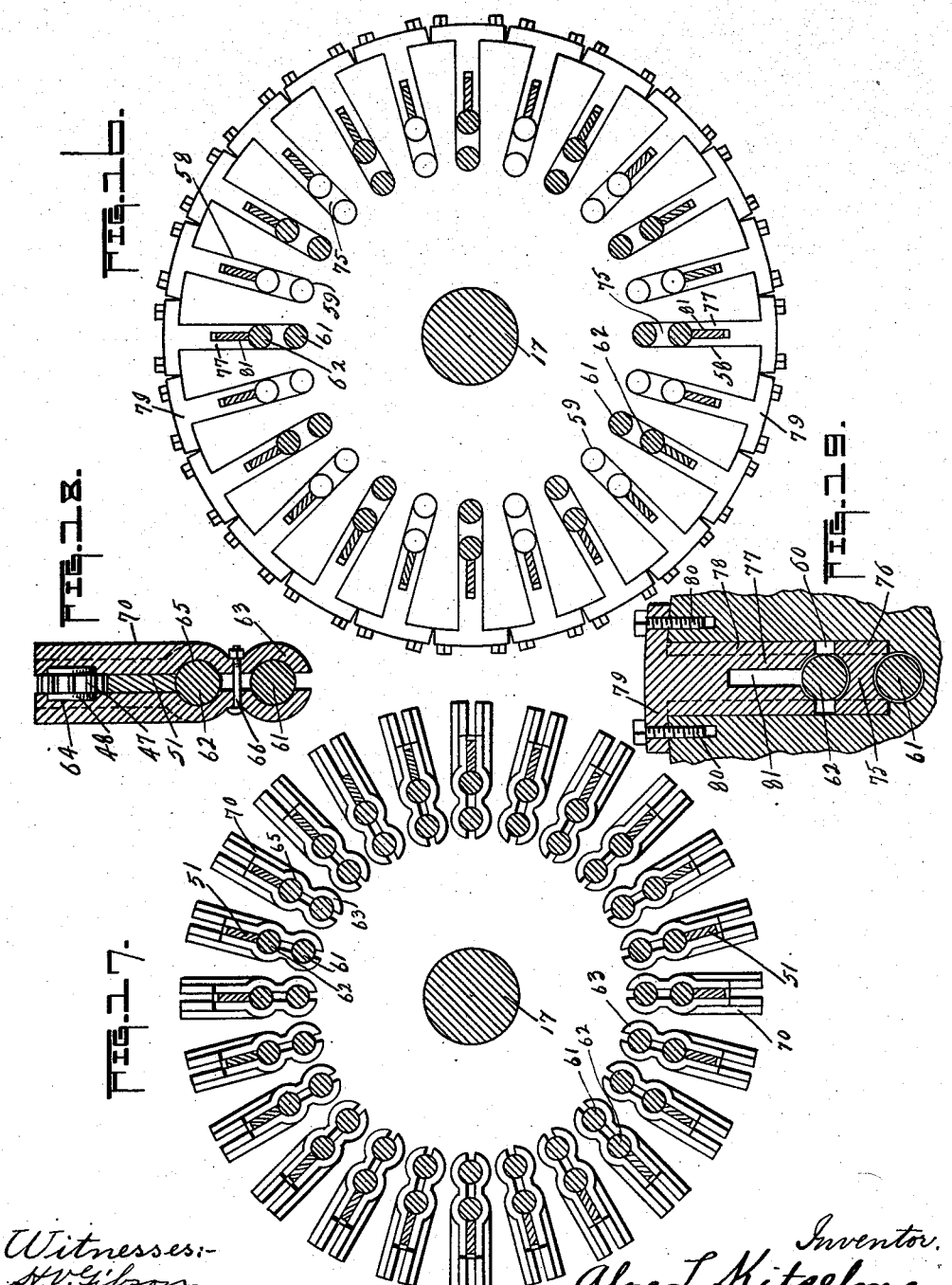

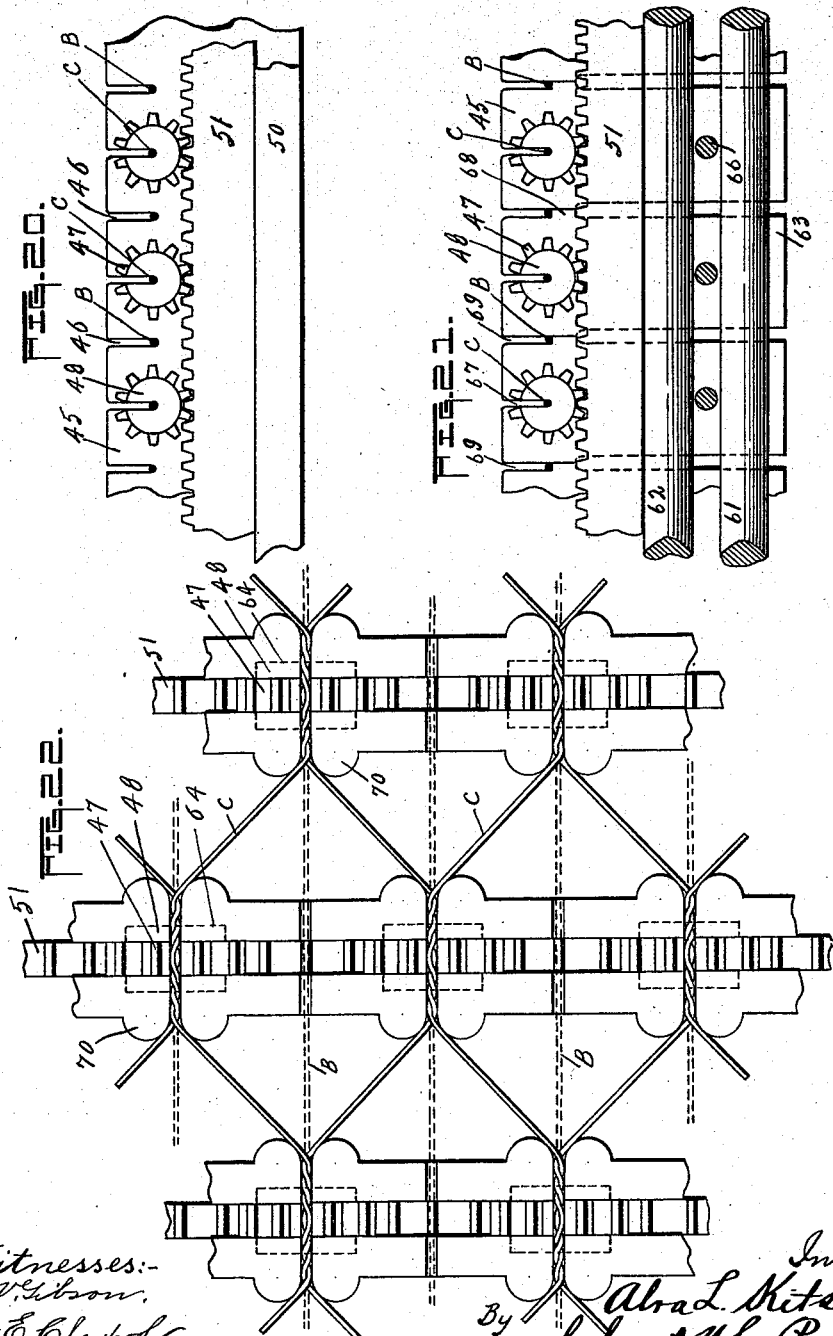

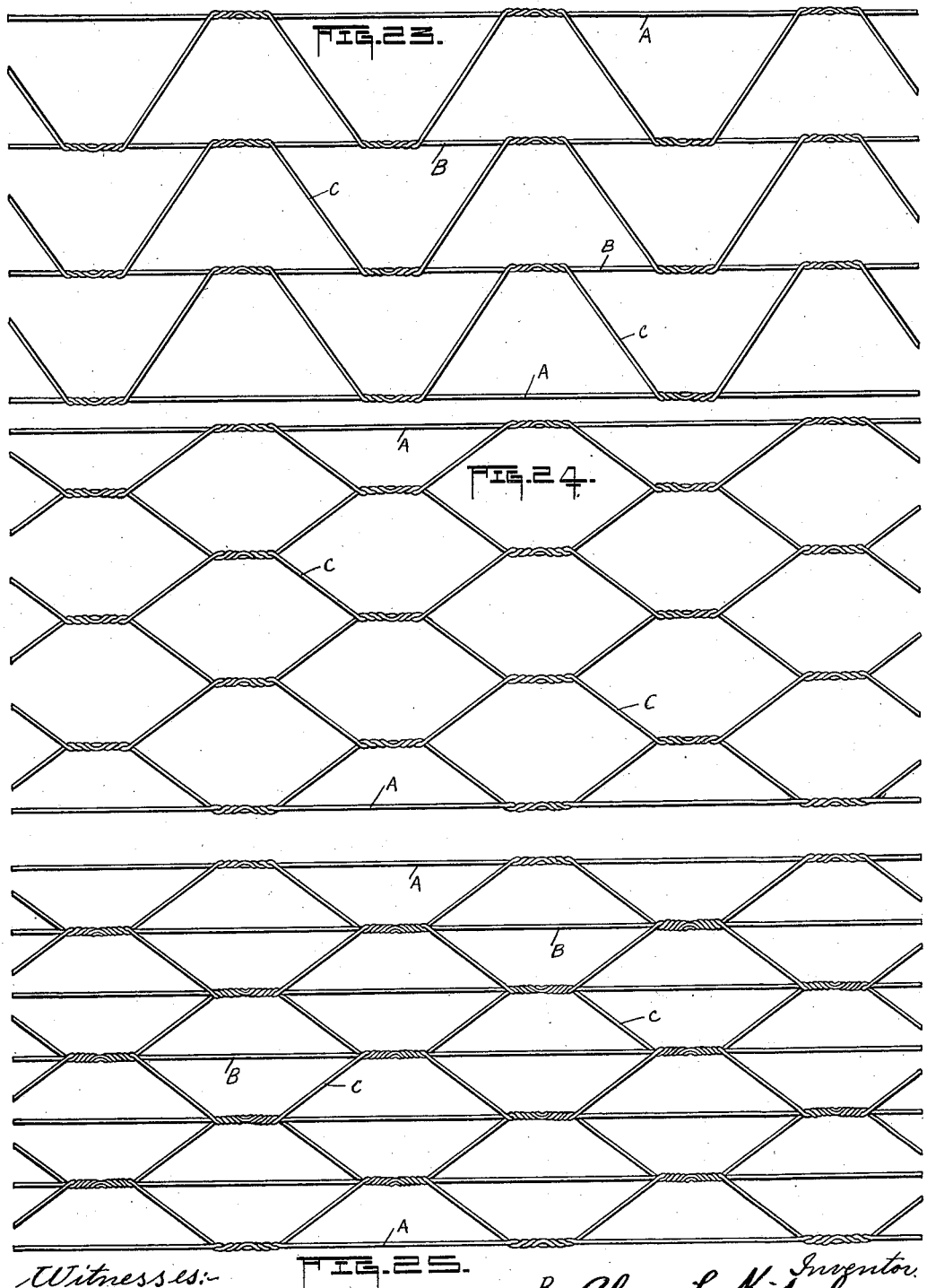

UNITED STATES PATENT OFFICE.

ALVA L. KITSELMAN, OF MUNCIE, INDIANA.

WIRE-WEAVING MACHINE.

1,014,599.   Specification of Letters Patent.   Patented Jan. 9, 1912.

Application filed July 1, 1908. Serial No. 441,382.

*To all whom it may concern:*

Be it known that I, ALVA L. KITSELMAN, a citizen of the United States, residing at Muncie, in the county of Delaware and State of Indiana, have invented certain new and useful Improvements in Wire-Weaving Machines; and I do hereby declare that the following is a full, clear, and exact description of the invention, which will enable others skilled in the art to which it appertains to make and use the same.

This invention has reference to machines for weaving wire fence fabrics and is designed more especially for weaving light fabrics, such as a poultry netting or fabrics which are made up of comparatively light wire having small meshes which may be used for trailing climbing vines and similar plants. If used as a poultry netting, it may be made in various widths or heights, up to six or seven feet or more, and if used for vines and plants, the fabric may be made in panels of different widths, as may be desired.

The preferred construction of fabric or the shape of the meshes to be woven in the fabric, are a half diamond mesh; or a plain hex-netting with the marginal and mesh forming wires only, or a hex-netting, including not only the marginal and mesh forming wires, but also intermediate line wires which pass through the meshes; although it is to be understood that no limitation is here placed on the character of the netting to be made, as other and various forms might be made if it were desirable.

One of the objects of the present invention, is to provide a wire weaving machine for the manufacture of fabrics such as I have referred to, which may be operated continuously, thereby producing the fabric very rapidly and at considerable less cost than heretofore. It has not been a difficult proposition to manufacture continuously and very rapidly what is known as field fencing having different styles of meshes, which are naturally much larger than the meshes in fabrics such as I have herein referred to, and where the twisting, coiling or connecting devices are arranged at convenient distances apart, but it has been a difficult matter to manufacture continuously and very rapidly fabrics or netting, such as herein referred to, because of the fact that the meshes are very small, necessitating that the twisters, coilers or connecting devices shall be placed very closely together, whereby the small meshes desired may be formed. Fabrics or netting such as I have referred to, are not new with me, but machines which have been constructed to make the same are very slow and have an intermittent operation, making it costly to produce and causing it to be sold at a much less profit than would be the case where the wires could be handled continuously and the fabric produced rapidly, such as is the case with a machine or machines such as herein illustrated and hereinafter described.

The invention has for its further object, the supporting of the twisters, coilers or connecting devices on a movable or traveling support, preferably a rotary drum, to which and over which the line and mesh forming and marginal wires are fed and during the interval of the wires passing over the drum, they are operated upon by the twisters, coilers or connecting devices for weaving the said wires to produce a fabric or netting desired, and from said drum, the completed fabric or netting is led to and wrapped about a suitable wrapper or similar means.

The invention has for its further object, the supporting of the twisters, coilers or wire connecting devices upon suitable supports on the drum, which said supports are adapted to be moved lengthwise of the drum with the twisters, coilers or connecting devices carried thereby, whereby as the mesh forming wires are fed into or engaged by the twisters, coilers or wire connecting devices, said wires are shifted or deflected for the purpose of placing them in line with the line and marginal wires, which are subsequently fed into or engaged by the twisters, coilers or wire connecting devices engaging the mesh forming wires, for connecting said mesh forming wires with the line and marginal wires for producing the fabric or netting desired. In other words, the line, mesh forming and marginal wires are fed to the twisters, coilers or wire connecting devices in parallel lines, and the marginal and line wires maintain their same direction of travel during the connection of the same with the mesh forming wires, the same as they do when they are being fed to the same, but the mesh forming wires are fed into or engaged first by the twisters, coilers or connecting devices, and after such feeding into or engagement of the mesh forming wires by said twisters, coilers or connecting devices, the traveling supports which carry the twisters, coilers or connecting devices, are moved lengthwise for the purpose of deflecting the mesh forming wires, whereby they are alternately carried from adjacent line wires or adjacent line and marginal wires, so as to be brought in the line of travel of the line and marginal wires, when said line and marginal wires are then engaged by the twisters, coilers or connecting devices, and said line, marginal and mesh forming wires where they coincide, are twisted together, preferably by a right and left twist; that is to say, it is preferred to feed the wires into what may be termed body twisters, where the wires within the twisters are twisted right and left from the center of the said twisters.

The invention has for its further object, the supporting of the twisters, coilers or wire connecting devices in a support adapted to be intermittently moved lengthwise and to operate the said twisters, coilers or wire connecting devices by means movable lengthwise of their support and beneath said twisters, coilers or connecting devices; said supports and operating means for the twisters, coilers or connecting devices adapted at predetermined intervals to be simultaneously moved lengthwise, and said operating means also adapted to be moved lengthwise through said support during an interval when said support is held against lengthwise movement.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a greatly reduced side elevation of a wire weaving machine embodying my improvements, with certain of the wires being fed thereto; Fig. 2 is a front elevation thereof and on approximately the same scale as the machine is shown in Fig. 1; Fig. 3 is a front elevation on a somewhat larger scale of only a portion of the machine as it is shown in Fig. 2; Fig. 4 is a longitudinal section of the machine as the same would appear if taken on the line 4—4 of Fig. 1; Fig. 5 is an enlarged cross section as the same would appear if taken on the line 5—5 of Fig. 2 and looking in the direction of the arrow on said figure; Fig. 6 is an enlarged cross section as the same would appear if taken on the line 6—6 of Fig. 2 and looking in the direction of the arrow on said figure; Fig. 7 is an enlarged cross section as the same would appear if taken on the line 7—7 of Fig. 2 and looking in the direction of the arrow on said figure; Fig. 8 is an enlarged cross section as the same would appear if taken on the line 8—8 of Fig. 2 and looking in the direction of the arrow on said figure; Fig. 9 is an enlarged detail section showing the manner of supporting and operating one of the twisters as the same are embodied in the construction shown in Fig. 8; Fig. 10 is a detail elevation showing a portion of one end of the machine with the twisters and their supports removed, the cam tracks, one of the end heads for the twister supports and also the intermediate head; Fig. 11 is an enlarged elevation of one of the end heads for the twister supports and looking at the end head shown in Fig. 10, in the direction of the arrow indicated in said figure; Fig. 12 is an enlarged elevation of the intermediate head, in which rests the twister supports, and looking at said head, as the same appears in Fig. 10, in the direction of the arrow on said last mentioned figure; Fig. 13 is an enlarged detail in plan, showing one end of one of the twister supports, a rack-bar and the attachments in connection with said support and rack-bar, to which are connected rollers which are adapted to travel in the cam tracks disclosed in Fig. 10; Fig. 14 is a side elevation of the devices shown in Fig. 13; Fig. 15 is an enlarged partial longitudinal section of the machine as the same is shown in Fig. 4, except that the twister supports are of a different construction from that shown in said figure; Fig. 16 is a cross section as the same would appear if taken on the line 16—16 of Fig. 15; Fig. 17 is a cross section as the same would appear if taken on the line 17—17 of Fig. 15; Fig. 18 is an enlarged detail section showing the manner of supporting the twister and twister supports as the same are embodied in the construction shown in Fig. 16; Fig. 19 is an enlarged detail section of a portion of the head shown in Fig. 16 and parts supported thereby; Fig. 20 is a detail showing one of the twister supporting bars, similar to that shown in Fig. 4, a rack-bar and several twisters in mesh with the rack-bar; Fig. 21 is a view similar to Fig. 20, except of the devices which are shown in Fig. 15; Fig. 22 is a diagrammatic plan on a scale much larger than the scale to which Fig. 15 is drawn, but of devices similar to those shown in Fig. 15, showing the completion of a section of a hex-netting without the intermediate line wires interwoven therein, but said intermediate line wires are shown in dotted lines; Fig. 23 shows a section of a fabric or netting having a half diamond mesh a little smaller than the full size of the mesh; Fig. 24 shows a section of a fabric or netting having hexagon shaped meshes a little smaller than the full size of the mesh, and omitting the intermediate line wires; Fig. 25 shows a section of a fabric or netting similar to Fig. 24, except that the intermediate line wires are introduced or woven therein.

Like numerals of reference indicate corresponding parts throughout the figures.

The frame work for the machine, as the same is shown in the drawings, comprises the end supports 1, preferably formed with the half-boxings 2, 3, 4 and 5, and with said half-boxings coöperate the caps 6, 7, 8 and 9 to form bearings for shafts, which will be described. The caps 6 are formed integral with standards or supports 10 formed with half-boxings 11 and 12, with which coöperate the caps 13, forming bearings for shafts, to be described, and said caps 13 are integral with standards 14 provided with the half-boxings 15 with which coöperate the caps 16, forming bearings for a shaft, to be described.

17 denotes a drum-shaft which is journaled at its opposite end in the bearings formed by the half-boxings 2 and the caps 6, and on one end of the said shaft is a gear-wheel 18, shown in dotted lines in Fig. 1 and in full lines in Fig. 2, and said gear-wheel meshes with a pinion 19 and a gear 20, both of which are shown in dotted lines in Fig. 1, and the pinion shown in full lines in Fig. 2; the pinion carried by a driving-shaft 21, journaled at its opposite ends in the bearings formed by the half-boxings 3 and the caps 7, and the gear 20 carried by a shaft 22, having its opposite ends journaled in the bearings formed by the half-boxings 4 and the caps 8. The shaft 21 is a driving-shaft and although no means has been shown for driving the same, it may be driven in any suitable manner from any source of power, so that when operated, power may be transmitted from the driving-shaft 21 through the pinion 19 to the drum-shaft 17, through the gear 18. The shaft 22 may likewise be referred to as a drum-shaft, for on this shaft is carried a drum, referred to as 23, and indicated by dotted lines in Fig. 1, and it is over this drum that the completed fabric is carried or directed in its travel to the wrapper or take-up, which I have indicated as 24, carried by a shaft 25 having its opposite ends journaled in the bearings formed by the half-boxings 5 and the caps 9. The drum 23 is operated through the inter-meshing of the gears 18 and 20, when the drum-shaft 17 is in motion, and when in operation, relieves the friction which might be occasioned by the passing of the fabric over the drum 23, if no motion was imparted to said drum. I have shown no means for driving the wrapper or take-up 24 for the completed fabric, as it may be driven from any independent source of power, or may be driven from any of the shafts 17, 21 or 22, and have in such drive any compensating means, whereby as the roll of fence fabric becomes larger, the driving-means will accommodate itself thereto.

26 and 27 denote a pair of similar and parallel shafts which have their opposite ends journaled respectively in the bearings formed by the half-boxings 11 and 12 and the caps 13 of the standards 10 and 14, and 28 denotes a shaft similar to the shafts 26 and 27, which has its opposite ends journaled in bearings formed by the half-boxings 15 of the standards 14 and caps 16. On the shafts 26, 27 and 28, as shown in Figs. 2, 3, 5, 6, 7 and 8, are carried a plurality of grooved wheels 29, 30 and 31. Over the wheels 29, on the shaft 26, are adapted to pass marginal and intermediate line wires, while over the wheels 30, on the shaft 27, are adapted to pass the mesh-forming wires, and over the alternate wheels 31 are adapted to pass the marginal and intermediate line wires, which also pass over the wheels 29 and over the intermediate wheels 31 on the shaft 28, are adapted to pass the mesh-forming wires which pass over the wheels 29 on the shaft 27.

Referring to Fig. 3, the marginal wires are indicated as A, and these wires are shown as passing over the outside wheels 31 on the shaft 28 and corresponding wheels 29 on the shaft 26. In this same view, the intermediate line wires are indicated as B and they are shown passing over the alternate wheels 31 on the shaft 28, and the intermediate wheels 29 on the shaft 26, while C indicates the mesh-forming wires which are disposed alternately with the line wires, and passing over the intermediate wheels 31 on the shaft 28, and also over the wheels 30 on the shaft 27, which said wheels are placed alternately with respect to the wheels 29 on the shaft 26. The plurality of sets of wheels referred to as 29, 30 and 31, are retained in proper position on their shafts 26, 27 and 28, by the collars 32, fixed to the said shafts at the end of each row of said wheels, the wheels being free to rotate through the action of the wires engaging the same, thereby relieving the friction of wire to wheel, which would be the case if said wheels did not rotate, and which would cause said wires to be worn in their passage from the feeding wheels, not shown, to the drum.

On each end of the shaft 17 and extending inwardly for a suitable distance from the frame supports 1, are shown corresponding drums 33, having a bearing at the inner ends on the said shaft, and their outer ends are fixedly secured to the frames 1 by being bolted thereto, as shown at 34; it being understood that while the shaft 17 is rotated, the said drums are not. Each of the said drums are provided with corresponding cam tracks 35 and corresponding cam tracks 36. These cam tracks are best seen in Fig. 10, although only one of the drums 33, is shown, but it is understood that the cam tracks 35 and 36 on the drum 33, at the other end of the shaft, is substantially and identically the same. The cam tracks 35 and 36 are dissimilar, with the exception that at 37 in the cam track 35, and 37ª in the cam track 36, said cam tracks 35 and 36 are substantially the same, in a manner and for a purpose which will be further explained.

Adjacent to each of the inner ends of the drums 33 on the shaft 17, are carried and fixed to rotate with the said shaft, similar heads 38. These heads are each provided with a plurality of spaced slots or cut-out portions 39, which extend down into said heads, a suitable distance from the peripheries thereof. Intermediate the said slots or cut-out portions 39 of the heads 38, said heads are provided with the inwardly projecting flanges 40, having their matching faces spaced apart a distance equal to the matching faces of the walls of the slots or cut-out portions 39, and said flanges are united at their lower ends, by the cross pieces or shelf portions 41, which have their upper faces on a line drawn concentrically through the base of the cut-out portions or slots 39 in said head, and the body of the said heads are provided with the radially disposed slots 42, which are disposed in the body of the head intermediate the flanges 40 and extend from the upper face of the shelf portions 41 to a point removed a short distance from the peripheries of the said heads, the purpose of the cut-out portions or slots 39, the flanges 40, the shelf portions 41 and slots 42 will be further explained. Intermediate the heads 38 on the shaft 17, is carried a head 43, which is also fixed to rotate with the said shaft in unison with the heads 38 when said shaft is rotated. This head is somewhat similar to the heads 38, although not quite so large in diameter, and is provided with a plurality of cut-out portions or slots 44 extending down into said head a suitable distance from the periphery thereof. The heads 38 and 43 are best seen in elevation in Figs. 11 and 12, and their purposes will be further explained.

The heads 38 and 43, as they have been described, are intended to support a plurality of bars 45. Each set of bars comprises two, which are of suitable length and spaced with their matching faces a short distance from each other, and each bar of each and every set is provided with a plurality of wire grooves or slots 46 extending down into the said bars a suitable distance from the outer edge thereof. Coincident with each pair of matching grooves or wire slots in the bars, if desired, or only coincident with each alternate pair of grooves or wire slots in the said sets of bars, may be rotatably mounted a wire connecting device 47, preferably a body twister having gear teeth around its periphery and provided with a wire slot extending down into the body thereof, and projecting laterally from each face is a hub 48, which is adapted to be journaled in recessed portions 49 in the matching faces of each set of bars 45, as shown in Fig. 9, whereby the said twisters may be rotated. Each pair of bars 45, intermediate their ends, rest within and have lengthwise movement in the slots or cut-out portions 44 of the intermediate head 43, and each alternate set of bars are seated in, project through and have movement lengthwise in the slots or cut-out portions 39 of a head 38 at one end of the machine, while at the other end of said machine, said sets of bars instead of resting in, projecting through and having movement lengthwise in the slots or grooves 39, of the heads 38, rest upon the shelf portions 41 on said head, and have movement between the flanges 40 thereof. That is to say, a set of bars 45 at one end of the machine, will project through the slots or cut-out portions 39 of a head 38, but at the opposite end of said machine, that set of bars will not project through the head, but will rest upon the shelf portions 41 between the flanges 40, as each alternate set of bars is driven from the opposite end of the machine, as will be more fully explained, and it is necessary to project the said bars through the head 38, whereby means may be connected thereto to coöperate with one of the cam tracks on the drum 33, for causing the said sets of bars to be moved longitudinally during a rotation of the drum. Each set of bars 45 are held suitably spaced apart at their upper edges by the mounting of the twisters therebetween, while at the lower edge, the said bars are held in like manner, suitably spaced apart, by means of a spacing bar 50 which extends lengthwise of and between the said bars, to which the bars 45 may be connected, and the upper edge of the spacing bars 50, are spaced a suitable distance from the twisters, to provide room for rack-bars 51, which are carried between the bars 45, movable lengthwise on the spacing bars 50, and in mesh, as will be understood, with the gear teeth of each of said twisters, so that upon moving the rack-bars 51 lengthwise, said twisters may be operated. Although the sets of bars 45 at one end or the other of the machine, rest upon the shelf portions 41 of the heads 38 and between the flanges 40, the rack-bars 51, which are movable therebetween, extend through the slots 42 in the heads 38 between the flanges 40, so as to provide sufficient length of rack-bar, whereby when they are operated, they may be moved sufficiently far to cause the required number of turns to be given to the twisters 47 for connecting the wires to produce a fabric netting.

To that end of each set of bars 45 which project through the heads 38, I attach a block 52, see Figs. 4, 6, 13 and 14, and to the lower face of said blocks, are revolubly connected rollers 53 which are designed to travel through the cam tracks 35 of the drums 33, as best seen in Fig. 4. The rack-bars 51, which are disposed between the sets of bars 45, for operating the twisters, and movable longitudinally of said bars, project beyond the ends of the sets of bars 45, to which are attached the blocks 52, and to the outer ends of said rack-bars are suitably connected or secured blocks 54, to the lower face of which are revolubly connected rollers 55, which are designed to travel through the cam tracks 36 of the drums 33, as shown in Fig. 4. The blocks 54 in cross section, are shaped somewhat as seen in Fig. 7, and are carried or supported to be moved lengthwise on a pair of rods 56, which are secured at their inner ends in the heads 38, and at their outer ends are connected to a ring 57, which may be detachably or otherwise carried by the drums 33, as best seen in Fig. 2.

Attention being called to Figs. 2 and 10, it will be seen that the rollers 53, carried by the sets of bars 45, as they travel around the drums 33 and through the cam tracks 35, said rollers will be caused to move in an irregular path, the most irregular portion of which appears at 37, as shown in Fig. 10, causing said rollers at a certain point in their travel, to move toward the head 38, which will cause the set of bars 45 carrying the same, to be moved lengthwise and projected longitudinally toward the opposite end of the machine. The object of so moving the rollers 53 in the cam tracks 35, and for projecting each set of bars 45 longitudinally of the machine, is for the purpose of moving the twisters or the wire connecting devices 47 from a position beneath the wire wheels 30, over which move the mesh-forming wires to a point in line with the intermediate line wires and marginal wires, which subsequently enter the said twisters or wire connecting devices. It will be understood that if the twisters or wire connecting devices 47 are moved to a position through the rotation of the drum to receive the mesh-forming wires, the wire slots in the said twisters, must be coincident with the pair of corresponding wire grooves or slots 46 in the bars 45, and that they must be retained in position until after the line or marginal wires have been fed into said twisters or wire connecting devices, and were not the rack-bars moved simultaneously with the movement of the sets of bars 45, when the rollers 53 are traveling through that portion of the cam tracks 35, indicated as 37, the twisters or wire connecting devices would move over the said racks and their positions changed, so it is provided that simultaneously with the longitudinal movement imparted to the bars 45, the rack-bars will be moved longitudinally for the purpose of insuring that there will be no motion given to the twisters during their reception of the mesh-forming wires and moving them into position and receiving of the line or marginal wires. This is accomplished by providing the cam track 36 with a portion thereof, indicated as 37$^a$, which shall correspond and be similar to the portion 37 of the cam track 35, whereby, when the rollers 53 of the bars 45 are moving through that portion of the cam track 35, indicated as 37, the rollers 55 of the rack-bar 51, carried by the bars 45, which support the rollers 53, will move through the portion 37$^a$ of the cam track 36, simultaneously as the rollers 53 move through the portions 37 of the cam track 35. It will be also noted, upon an examination of Fig. 10, that after the rollers 55 leave the portion 37$^a$ of the cam track 36, they will travel in a straight portion 37$^b$ in the cam track 36, which is parallel with a corresponding portion of the cam track 35, so as to retain the twisters or wire connecting devices in an inoperative position or against rotation, until after the reception by said twisters or wire connecting devices of the line or marginal wires, and that immediately upon the twisters or wire connecting devices receiving said line or marginal wires, the rollers 55 connected with the rack-bars, will move down the inclined portion of the cam track 36 in the direction of the arrow shown in Fig. 10, or toward the ends of the shafts 17, when the rack-bars will be moved longitudinally or projected lengthwise, for the purpose of rotating the twisters or wire connecting devices for twisting the mesh-forming wires with the line or marginal wires.

During the operation of moving the rack-bars, as just described, it is necessary to retain the bars 45 inoperative, so far as lengthwise or longitudinal movement is concerned, and this is accomplished by constructing the cam track 35 with the straight portion 37$^c$, which will hold the rollers 53 to a straight course during the interval of travel that the rollers 55 may have in the cam track 36, which will cause the rack-bars to be moved for operating the twisters or wire connecting devices. After this operation and when the completed fabric has been released, both the rollers 53 and 55 may travel in a desirable course around the remaining portion of the drum 33, through the respective cam tracks 35 and 36, for the purpose of bringing the twisters or wire connecting devices into a position to receive the mesh-forming wires, and then moved, as above described, to a position, so that the line and marginal wires may enter into the same. It will be understood that as the rollers 55 are moving through the cam track 36 toward the outer ends of the machine, for the purpose of moving the rack-bars, that the blocks 54 have a sliding motion on the rods 56, which serve as guides for the said blocks.

In Figs. 15, 16, 17 and details of parts thereof, I have shown a preferred form of support for the twisters, coilers or wire connecting devices on the drum. With the form of twister, coiler or wire connecting device support, such as shown in the figures just mentioned, the removal of one twister, coiler or wire connecting device, or a row of the same from the drum, may be accomplished in an easy and convenient manner, which is not the case with the form of twister, coiler or wire connecting device support shown in Fig. 4 and similar figures.

Referring to Fig. 16, showing in elevation one of the heads 38, carried by the shaft 17, it will be observed that said head is provided with a plurality of radially disposed slots or cut-out portions 58, extending down into said head a suitable distance from the periphery thereof, and that the inner or end wall 59 of said groove, is semi-circular in shape or concave, as shown, and the side walls of the said slots or cut-out portions 58, are provided with grooves 60, extending lengthwise of the same, as best seen in Fig. 19.

Instead of the bars 45 for supporting the twisters, coilers or wire connecting devices 47, as shown in certain of the figures, and particularly in Figs. 9 and 20, I employ a plurality of pairs of superimposed supporting rods 61 and 62, each alternate pair of said rods at one end of the machine, projecting through the alternate slots or cut-out portions 58 of the head 38 at that end of the machine, substantially in like manner and for the same purpose as do the bars 45, previously described, and the said rods which project through a head 38 at one end of the machine, merely extend into and have movement in slots or cut-out portions 58 in the head 38, at the opposite end of said machine, see Fig. 15, in the lower portion of which, a pair of rods 61 and 62, are shown projecting through the head 38 at the left hand end of the machine, and at the right hand end thereof, said rods merely extend into and have movement in the head 38.

Intermediate the heads 38, each pair of superimposed supporting rods 61 and 62, have connected thereto and support a series or a plurality of twister supporting brackets, which said brackets comprise duplicate plates 63. The matching faces of these plates at or near their upper ends, are provided with recessed portions 64, in which may be seated and have bearing, the hubs 48 of the twisters 47, as shown in Fig. 18. These plates are secured to the pairs of rods 61 and 62, by providing the matching faces of the said plates, with corresponding semi-circular recessed portions 65, whereby the said plates may be clamped in pairs to the rods 61 and 62, as shown in Fig. 18, by bolting the said plates together as at 66, or otherwise suitably securing the same. When the pairs of plates 63, which, together, form the brackets referred to for supporting the twisters, are clamped to the rods 61 and 62, sufficient space is left between the matching faces thereof, to allow for the free rotation of the twisters 47 mounted therebetween, and to also allow for the carrying of the rack-bars 51 between the matching faces and below the twisters to be in mesh therewith, and above the rods 62, which may form a support for the said rack-bars to slide upon, as they are moved longitudinally for the purpose of rotating the twisters.

Looking at Fig. 15, it is shown in what manner a row of twister supporting brackets composed of a plurality of pairs of plates 63, are supported by the rods 61 and 62. In this said figure, the plates 63 at their upper ends, are provided approximately with the centrally disposed wire grooves or slots 67, extending down into the said plates a suitable distance from the upper edges thereof, or to a point which coincides with the base of the wire grooves or slots in the twisters 47. Said plates are also shown provided with lugs 68 projecting from one of the side edges thereof, and disposed at a suitable point from the upper edges of said plates, so that when adjacent plates are assembled in a row, as shown in Fig. 15, the lugs 68 of one plate, abut against the flat edge of its adjacent plate, producing what is referred to as a wire groove 69, extending from the top edges of adjacent plates to the top edges of the lugs 68, which produces a wire groove similar to those referred to as 67 in the plate 63 and of the same depth as the said wire grooves 67. However, there are no twisters coincident with said grooves 69, and said grooves are merely provided for the purpose of forming a seat for the line and marginal wires, when it is desired to produce a fabric having a hex-mesh with the line wires extending through the meshes, as shown in dotted lines in Fig. 22. In this connection, it may be well to note that in each of the bars 45, previously referred to, wire grooves similar to those shown at 46 are disposed intermediate the wire grooves which coincide with the twisters 47 supported by the said bars, and serve a like purpose, as the wire grooves 69, shown in Figs. 15 and 22.

With the construction of the cam tracks 35, as they are shown, it is not practical to weave a fabric or netting other than those which have a diamond mesh and shown in Fig. 23, and if it is desired to manufacture a hex fabric or netting, as shown in Figs. 24 and 25, the form of the cam tracks 35, will have to be modified so as to provide for moving the successive rows of twisters, coilers or wire connecting devices, to place said twisters, coilers or wire connecting devices with the wires engaging the same, in a position to weave the meshes shown in the fabrics or netting illustrated in Figs. 24 and 25.

Again calling attention to Figs. 15 and 22, it will be seen that each of the plates 63 is provided with the beveled ribs 70, extending lengthwise of the said plates from the top edges thereof, to a suitable point below the wire grooves or slots 67, with the said ribs on either side of each of the said grooves 67, so that the mesh forming wires where they leave the grooves 67, in one set of plates, and are directed to similar grooves in another of said set of plates in an adjacent row will be directed over said beveled ribs 70, in the manner shown in Fig. 22, and thereby shape the meshes of the fabric without any sharp corners which might have a tendency to kink the wires where they are directed around a sharp corner. Using very light wire in the manufacture of light fabrics and nettings, it is desirable to obviate any kinking or wearing of the wire, which would have a tendency to weaken the same.

To each set of rods 61 and 62 are suitably secured blocks which I have indicated as 71, to the lower face of which, are connected rollers 72 which are in most respects similar to the rollers 53 carried by the blocks 52 attached to the bars 45, and serve the same function as do the said rollers 53; that is, they travel in the cam tracks 35 of the drums 33, whereby the pairs of rods 61 and 62 with their twister supports, may be moved longitudinally of the drum, substantially in the same manner and for the same purpose as the bars 45 are moved. The rack-bars 51, which coöperate with the twisters carried by the brackets supported by the rods 61 and 62, pass through the heads 38, and have connected therewith, blocks 73, which are slidably mounted on the rods 61 and 62, and have revolubly connected therewith, rollers 74, which are in most respects similar to the rollers 55, carried by the block 54, connected with the rack-bars which are reciprocally carried between the sets of bars 45, and said rollers 74 are adapted to travel in and coöperate with the cam tracks 36 of the drums 33, in like manner and for the same purpose as do the rollers 55, previously described.

Attention is here called to the mounting of the rods 61 and 62 in the heads 38. Where the rods 61 and 62 pass through the heads 38, they are held suitably spaced apart by spacing blocks 75, which have a vertical slidable relation with the slots or cut-out portions 58 in the said head through ribs 76 of the said blocks 75, which have a slidable relation with the grooves 60, with the matching side walls of the slots or cut-out portions 58, as shown in Fig. 19, and the rods when in normal position, in said slots or cut-out portions 58, are so disposed that the rods 61 rest upon the semicircular seat portions 59, at the base of said slots or cut-out portions 58, and to retain the rods 61 and 62 in operative positions in the heads 38, and yet allow them to be moved endwise through the heads at predetermined intervals when the rollers 72 are traveling through the cam tracks 35, retaining blocks 77 are employed, which have a slidable relation with the slots or cut-out portions 58 of the heads, through ribs 78, which coöperate with the grooves 60 in the matching walls of the slots or cut-out portions 58, as aforesaid, and said retaining blocks 77 have the head portions 79, by means of which the said blocks may be secured to the head, by bolting, as at 80, or otherwise suitably securing the same thereto. These retaining blocks are provided with the elongated slots 81 in the bodies thereof, through which the rack-bars 51, are carried and have movement during the travel of the roller 74 through the cam tracks 36.

The object of providing a twister support, or supports, such as shown in Fig. 15, and retaining the rods 61 and 62 in the heads 38, as I do, is for the purpose of enabling an operator to remove an entire row of twisters or one or more, in a convenient and easy manner, and also for the purpose of saving as much time in the removing and replacing of the same, when it is desired to move the same for any purpose whatever. To remove an entire row of twisters, all that will be necessary to do, is to release the bolts 80 or other securing means for securing the retaining blocks 77 in the heads 38, when the rods, together with the twister supporting brackets, the rack-bars, the spacing blocks 75 and the blocks 71 and 73, carrying the rollers 72 and 74, may be removed from the drum and may be easily replaced by reversing the hereinbefore described operation; or if it is desired, to only remove one of the twister supporting brackets, it is only necessary that the bolts 66, or securing means, be removed, then the plates 63 together with the twisters 64 carried thereby, may be removed from the machine.

The preferred construction of the wire connecting devices, is best seen in Figs. 20 and 21, and although in the slots of these twisters, no clamping means is shown, for gripping or holding the wires as they are deposited therein, yet it is understood that such may be used and, in fact, would be used in a complete and operative machine, and owing to the fact that such devices are known in the art, it has not been thought necessary to include the same in the drawings, exemplifying the machine herein.

An examination of the means for operating or reciprocating the rack-bars for the purpose of actuating the wire connecting devices, will disclose that the alternate rack-bars have imparted to them a pulling movement from the opposite ends of the machine, rather than a pushing movement; this is preferable, for the reason that the rack-bars are of necessity of very light construction, and under continual use would not stand the strain of being pushed, particularly under the strain of connecting the wires after they have been deposited in the wire connecting devices.

I am aware that it is not new to support wire connecting devices upon a movable or traveling carrier, for instance a drum, which is intended to be moved continuously and the wire connecting devices operated intermittently during the movement of the drum for connecting a plurality of wires fed thereto; also that it is not new to arrange the wire connecting devices in a row, and operate the same simultaneously by means of a rack-bar in operative connection with said wire connecting devices in connection with a traveling carrier or drum or upon a fixed support, and further, that it is not new to weave a field fencing having half-diamond meshes, meshes of a hexagon shape either with or without a line wire carried through the meshes upon a traveling carrier, or a rotary drum, but the wires in such a machine or machines, which are deflected for the purpose of weaving either the half diamond or hexagon meshes, were engaged by or fed through a particular and specific deflecting mechanism for the purpose of moving said wires to the alternate twisters of the several rows on the traveling carrier or drum, while in my machine, it is at once apparent that the supports upon the traveling carrier or the drum upon which the wire connecting devices are mounted, serve not only as the supporting means for the twisters, but also the deflecting means for deflecting the mesh forming wires out of line, for the purpose of making the meshes desired, and that in such a construction, particularly where a rack-bar is used, or equivalent means moving longitudinally beneath the twisters, said rack-bars, or equivalent means must, at predetermined intervals, and at the time the mesh-forming wires are deflected, be moved simultaneously with and in the direction of movement of the twister supporting and deflecting means for retaining the twisters inoperative or against rotation, which is that interval of time when the mesh-forming wires are being deflected, and until after the line wires have dropped into the wire connecting devices, which have previously received and been moved longitudinally for deflecting the mesh forming wires.

Having thus fully described my invention, what I claim and desire to secure by Letters Patent of the United States, is:—

1. In a wire weaving machine, the combination of a plurality of wire connecting devices arranged in a row, a support for said wire connecting devices, and means for moving said support longitudinally at predetermined intervals for deflecting wires engaged by said connecting devices.

2. In a wire weaving machine, the combination of a traveling carrier, a plurality of wire connecting devices arranged in a row and supported upon said carrier, means for moving said row of wire connecting devices at predetermined intervals for deflecting wires engaged thereby during the travel of the carrier, and means for actuating said wire connecting devices subsequent to the movement thereof for deflecting said wires.

3. In a wire weaving machine, the combination of a traveling carrier, a plurality of rows of supports mounted upon said carrier, a plurality of wire connecting devices arranged in rows and carried by said supports, means for moving the successive supports lengthwise at predetermined intervals for deflecting wires engaged by the connecting devices carried thereby, and means for intermittently and successively operating said rows of wire connecting devices.

4. In a wire weaving machine, the combination of a traveling carrier, a plurality of rows of supports mounted upon said carrier, a plurality of wire connecting devices arranged in rows and carried by said supports, means for moving the successive supports lengthwise and in opposite directions at predetermined intervals for deflecting wires engaged by the connecting devices carried thereby, and means for intermittently and successively operating said rows of wire connecting devices.

5. In a wire weaving machine, the combination of a support adapted to travel in an endless orbit, a plurality of rows of wire connecting devices arranged on said support, means for shifting simultaneously and in succession, each row of wire connecting devices at predetermined intervals during the movement of said support for deflecting wires engaged by said connecting devices, and means for intermittently and successively operating said rows of wire connecting devices during the movement of said support.

6. In a wire weaving machine, the combination of a plurality of wire connecting devices arranged in a row, a support for said wire connecting devices, reciprocally mounted means in said support for actuating the said connecting devices, means for moving said support lengthwise to deflect wires engaged by said connecting devices, means for moving the operating means for the connecting devices simultaneously with and in the same direction with the said support, and means for moving the operating means for the connecting devices in a reverse direction after the deflection of said wires for actuating the wire connecting devices to connect said wires.

7. In a wire weaving machine, the combination of a plurality of wire connecting devices arranged in a row and provided with toothed peripheries, a support for said wire connecting devices, a rack-bar carried by said support and in mesh with said connecting devices, means for moving the support lengthwise at predetermined intervals for deflecting wires engaged by said connecting devices, means for moving the rack-bars simultaneously with the support and in the same general direction therewith, and means for moving the rack-bar in a reverse direction subsequent to the deflection of the wires for actuating the connecting devices to connect said wires.

8. In a wire weaving machine, the combination of a plurality of rows of wire connecting devices, supports for each of said rows of connecting devices, rack-bars carried by each of said supports in operative connection with said connecting devices, a cam and means carried by said supports coöperating with said cam for intermittently moving the supports lengthwise to deflect wires engaged by said connecting devices, a cam and means carried by the rack-bars coöperating therewith, for moving each of said rack-bars simultaneously with their supports and in the same general direction therewith, said last mentioned cam so arranged, that said rack-bars are reciprocated subsequent to the deflection of the wires for actuating the twisters to connect said wires.

9. In a wire weaving machine, the combination of a traveling carrier, a plurality of wire connecting devices arranged in rows and supported upon said carrier, means for intermittently and successively shifting each of said rows of wire connecting devices during the movement of the carrier for deflecting wires engaged by said connecting devices, rack-bars in operative connection with each of said rows of connecting devices, means for retaining the connecting devices inoperative during the time they are shifted, and means for operating the rack-bars at predetermined intervals for actuating the connecting devices to connect the wires engaged thereby.

10. In a wire weaving machine, the combination of a rotary drum, supports reciprocally mounted on said drum, wire connecting devices mounted in said supports, means at the opposite ends of said drum coöperating with each alternate support for intermittently moving the same lengthwise for deflecting wires engaged by the connecting devices carried thereby, and means operating subsequent to the deflection of the wires for actuating the connecting devices to connect said wires.

11. In a wire weaving machine, the combination of a traveling carrier, a plurality of rows of supports mounted on said carrier, a plurality of wire connecting devices mounted in each support, means disposed at the opposite ends of alternate supports for moving said supports lengthwise at predetermined intervals for deflecting wires engaged by the connecting devices of the respective supports, and means in operative connection with the connecting devices of each row for actuating the said connecting devices, said means operated from the respective ends of their supports, from which said supports are moved for deflecting said wires.

12. In a wire weaving machine, the combination of a rotary drum, a plurality of supports mounted on said drum, a plurality of wire connecting devices carried by said supports and having toothed peripheries, a rackbar for each support in mesh with said connecting devices thereof, means disposed at the opposite ends of alternate supports for shifting said supports to deflect wires engaged by the connecting devices carried thereby, and means at the opposite ends of alternate rack-bars for reciprocating the same, whereby the connecting devices are actuated to connect the wires engaged thereby.

13. In a wire weaving machine, the combination of a rotary drum, a plurality of supports carried thereby, a plurality of wire connecting devices having toothed peripheries carried by said supports, means disposed at the opposite ends of alternate supports for shifting the same lengthwise to deflect wires engaged by the connecting devices carried thereby, and means at the opposite ends of alternate rack-bars for moving said rack-bars in one direction to actuate the connecting devices to connect wires engaged thereby, and for reversing the movement of said rack-bars to return the connecting devices to a position for receiving wires, said means so arranged that when the supports are moved to deflect the wires, the rack-bars are moved simultaneously therewith and in the same general direction.

14. In a wire weaving machine, the combination of a rotary drum, a plurality of supports mounted on said drum and having wire receiving grooves, a plurality of wire connecting devices carried by said supports coincident with certain wire grooves thereof, means for feeding marginal wires, intermediate line wires and mesh forming wires in parallel lines to said drum, means for moving each of said supports during the movement of the drum for deflecting the mesh forming wires after their engagement by the connecting devices, and means for actuating the twisters subsequent to the deflection of the mesh forming wires and during the movement of the drum for connecting the mesh forming wires to the line wires and marginal wires where they coincide.

15. In a wire weaving machine, the combination of a rotary drum, a plurality of supports mounted on said drum and having wire receiving grooves, a plurality of slotted wire connecting devices arranged in rows and mounted on said supports coincident with certain of the wire grooves thereof, means for feeding marginal wires, intermediate line wires and mesh forming wires in parallel lines to said drum to be engaged by the wire connecting devices thereof, means for moving said supports during the movement of the drum to a position to place the connecting devices in line with and to receive the mesh forming wires and to subsequently move said supports to deflect the mesh forming wires and bring said connecting devices into a position to receive the intermediate line wires and marginal wires where they coincide, and means operated subsequently to the reception by the connecting devices of the mesh forming, line or marginal wires, for actuating the connecting devices to connect said wires.

16. In a wire weaving machine, the combination of a rotary drum, a plurality of supports mounted on said drum and having wire receiving grooves, a plurality of wire connecting devices arranged in rows and mounted on said supports coincident with certain of the wire grooves thereof, means for feeding marginal wires, intermediate line wires and mesh forming wires in the same general direction to said drum, means for reciprocating said supports in one direction during the movement of the drum to cause the connecting devices of said supports to coincide with and receive the marginal wires and then to be reciprocated in an opposite direction for deflecting the mesh forming wires out of their line of travel, for the purpose of bringing the said connecting devices and the mesh forming wires engaged thereby, coincident with and to receive the intermediate line or marginal wires, means for actuating the connecting devices subsequent to their reception of the mesh forming, line or marginal wires, said actuating means capable of being moved simultaneously with the movement of the supports and in the same general direction therewith when said supports are moved for deflecting the mesh forming wires, for retaining the connecting devices inoperative until after they are brought coincident with and receive the intermediate line or marginal wires.

17. In a wire weaving machine, the combination of a rotary drum, comprising a shaft with heads carried thereby, a plurality of supports mounted on said heads, alternate supports having their opposite ends projected through said heads, a plurality of wire connecting devices mounted in said supports, means in operative connection with the projected ends of said supports for moving the same lengthwise through the heads for deflecting wires engaged by the connecting devices thereof, and means for operating the connecting devices at predetermined intervals.

18. In a wire weaving machine the combination of a rotary drum, comprising a shaft with heads carried thereby, a plurality of supports mounted on said heads, alternate supports having their opposite ends projected through said heads, a plurality of wire connecting devices mounted in said supports and having toothed peripheries, rack-bars carried by said supports in mesh with the connecting devices and projecting through said heads, with one end thereof projecting beyond the projecting ends of their supports, means in operative connection with the projected ends of said supports for moving the same lengthwise through the heads for deflecting wires engaged by the connecting devices thereof, and means in operative connection with the ends of the rack-bars projecting beyond the projected ends of the supports for reciprocating said rack-bars and thereby actuate said connecting devices.

19. In a wire weaving machine, the combination of a support, a pair of superimposed rods mounted on said support, brackets detachably secured to said rods, and wire connecting devices rotatably mounted in said brackets.

20. In a wire weaving machine, the combination of a traveling support, a plurality of sets of superimposed rods mounted on said support, a plurality of brackets arranged in rows and detachably connected with each set of superimposed rods, and wire connecting devices revolubly mounted in said brackets.

21. In a wire weaving machine, the combination of a shaft, a plurality of heads mounted to rotate with said shaft, a plurality of pairs of rods supported by said heads, a plurality of brackets supported by each pair of rods, and wire connecting devices revolubly mounted on said brackets.

22. In a wire weaving machine, the combination of a traveling support, a plurality of pairs of rods detachably mounted on said support, a plurality of brackets detachably secured to each set of rods, wire connecting devices revolubly supported by said brackets, and means for intermittently operating said connecting devices.

23. In a wire weaving machine, the combination of a traveling support, a plurality of pairs of rods detachably and reciprocally mounted on said support, a plurality of brackets supported by each pair of rods, wire connecting devices revolubly mounted on said brackets, means for intermittently reciprocating the said rods and the brackets carried thereby for deflecting wires engaged by the connecting devices thereof, and means for operating the connecting devices subsequently to the deflecting of said wires.

24. In a wire weaving machine, the combination of a support, a plurality of pairs of rods removably carried on said support, a plurality of brackets supported by each pair of rods, said brackets comprising each a pair of plates clamped to said rods, and wire connecting devices revolubly mounted between the plates forming said brackets.

25. In a wire weaving machine, the combination of a traveling support, a plurality of pairs of rods removably carried on said support, a plurality of brackets supported by said rods and consisting of a pair of plates clamped to said rods, wire connecting devices revolubly mounted between the plates forming the brackets, and means reciprocally supported between the plates forming the brackets and in operative connection with the wire connecting devices for operating said connecting devices.

26. In a wire weaving machine, the combination of a traveling support, a plurality of pairs of rods removably mounted on said support, a plurality of brackets detachably supported on each pair of rods, wire connecting devices revolubly mounted on said brackets and having toothed peripheries, means in operative connection with the opposite ends of each alternate pair of rods for reciprocating the said rods to deflect wires engaged by the connecting devices, rack-bars supported by said pairs of rods, and adapted to be moved through the brackets carried thereby, and means in operative connection with the opposite ends of each alternate rack-bar for reciprocating the same.

27. In a wire weaving machine, the combination of a shaft, a plurality of heads mounted to rotate with said shafts and provided with a plurality of radially disposed cut-out portions opening out of the peripheries of said heads, a plurality of pairs of rods supported by said heads with said rods mounted in and capable of being moved lengthwise through the cut-out portions in the said heads, twister supporting brackets detachably secured to each pair of rods, means for detachably retaining the rods in the cut-out portions of the heads, and yet allow for endwise movement thereof, means for reciprocating the rods at predetermined intervals, for the purposes described, and means also supported by said rods and operatively carried through said brackets for actuating twisters which may be supported thereby.

28. In a wire weaving machine, the combination of a plurality of supporting members spaced in a suitable manner to receive twister heads and slotted to receive wires, twister heads suitably journaled in said supports and having wire receiving slots arranged to coincide with certain of the slots of the supports, and means for moving said supports and twisters in a lateral direction for deflecting certain of the wires passing through said supports.

29. In a wire weaving machine, the combination of a revoluble drum, a plurality of rows of wire connecting devices carried upon and movable with the drum, and means for changing the position of each row of devices relative to its adjacent rows during each revolution of the drum.

30. In a wire weaving machine, in combination, a support arranged to travel in an endless orbit, a plurality of rows of wire connecting devices carried by and movable with said support, margin-wires, mesh-forming wires, and intermediate line-wires suitably fed to said connecting devices and partially carried around said drum, longitudinally movable means for operating said devices to connect the mesh-forming wires with the margin and intermediate line-wires, and means for moving certain of said connecting devices sidewise during their travel to deflect said mesh-forming wires.

31. In a wire weaving machine, the combination of a support, a plurality of wire connecting devices journaled on said support, each of said connecting devices being complete in itself, and means for shifting said support longitudinally and with it each complete connecting device in the same direction, whereby the connecting devices of the entire row are moved and likewise the wires passing through the same.

32. In a wire weaving machine, the combination of a support, a row of wire connecting devices journaled in said support, each connecting device being complete in itself, means for feeding marginal and line wires across the path of said devices without deflection, means for feeding mesh forming wires to said devices to be deflected thereby, and means for moving the support longitudinally and with it each of said devices in the same general direction for bringing the mesh forming wires into alinement with said marginal and line wires.

33. In a wire weaving machine, in combination, a support, means for moving said support sidewise, a plurality of connecting devices revolubly mounted on said support, wires fed through said devices, other wires with which said devices will coincide during their sidewise movement, means for moving said support and devices longitudinally to cause said first mentioned wires to be brought into engagement with said second mentioned wires, and means for operating said devices.

34. In a device of the class described, the combination of a revoluble drum, a plurality of wire connecting devices, a support for said wire connecting devices carried by said drum, and means for moving said support in the direction of the axis of said drum during the rotation of said drum.

35. In a machine of the class described, a group of twisting heads each provided with a radial slot open at the outer end and with peripheral teeth, a bar carrying all the twisting heads of a group in spaced relation, and a rack-bar carried by the first-named bar with its teeth in mesh with the peripheral teeth of all the twisting heads of the group, said rack-bar being capable of movement longitudinal to the carrying bar.

36. In a machine of the class described, a rotatable drum or carrier, twisting heads thereon disposed in a circular series of sets or groups of twisting heads, each set being longitudinal to the drum and in staggered relation to the next adjacent set, means for feeding line and mesh wires to the drum, and means carried by the drum for engaging the mesh wires and moving them alternately into operative relation to the staggered twisting heads of successive groups thereof.

37. In a machine of the class described, a twisting drum, means for directing line and mesh wires thereto, and means for moving the mesh wires alternately into operative relation to adjacent line wires, comprising longitudinally movable bars or rods carried by the drum, said rods or bars being movable simultaneously in opposite directions and provided with engaging means for the mesh wires.

In testimony whereof I affix my signature, in presence of two witnesses.

ALVA L. KITSELMAN.

Witnesses:
LAURA E. CLAYPOOL,
BERNADETTE MORIARTY.

---

Copies of this patent may be obtained for five cents each, by addressing the "Commissioner of Patents, Washington, D. C."